(12) United States Patent
Kadambi

(10) Patent No.: US 7,076,640 B2
(45) Date of Patent: Jul. 11, 2006

(54) PROCESSOR THAT ELIMINATES MIS-STEERING INSTRUCTION FETCH RESULTING FROM INCORRECT RESOLUTION OF MIS-SPECULATED BRANCH INSTRUCTIONS

(75) Inventor: Sudarshan Kadambi, Hayward, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 464 days.

(21) Appl. No.: 10/095,397

(22) Filed: Mar. 11, 2002

(65) Prior Publication Data

US 2003/0149865 A1 Aug. 7, 2003

Related U.S. Application Data

(60) Provisional application No. 60/355,465, filed on Feb. 5, 2002.

(51) Int. Cl.
*G06F 9/34* (2006.01)

(52) U.S. Cl. .................................. 712/244; 712/233

(58) Field of Classification Search ................ 712/244, 712/233, 234, 237, 240, 219
See application file for complete search history.

(56) References Cited

U.S. PATENT DOCUMENTS

| 5,519,841 | A | * | 5/1996 | Sager et al. ............... 712/240 |
| 5,765,037 | A | | 6/1998 | Morrison et al. ........... 395/557 |
| 5,838,988 | A | | 11/1998 | Panwar et al. .......... 395/800.32 |
| 5,850,533 | A | | 12/1998 | Panwar et al. .............. 395/392 |
| 5,898,853 | A | | 4/1999 | Panwar et al. .............. 395/392 |
| 5,958,047 | A | | 9/1999 | Panwar et al. .............. 712/237 |
| 5,987,594 | A | * | 11/1999 | Panwar et al. .............. 712/216 |
| 6,052,775 | A | | 4/2000 | Panwar et al. .............. 712/215 |
| 6,058,472 | A | | 5/2000 | Panwar et al. .............. 712/218 |
| 6,085,305 | A | | 7/2000 | Panwar et al. ................ 712/23 |
| 6,219,778 | B1 | | 4/2001 | Panwar et al. ................ 712/23 |
| 6,226,713 | B1 | | 5/2001 | Mehrotra ................... 711/118 |
| 6,240,502 | B1 | | 5/2001 | Panwar et al. ............... 712/15 |
| 6,269,426 | B1 | | 7/2001 | Hetherington et al. ...... 711/140 |
| 6,272,623 | B1 | | 8/2001 | Talcott ...................... 712/239 |
| 2003/0126405 | A1 | * | 7/2003 | Sager et al. ................ 712/200 |
| 2003/0126406 | A1 | * | 7/2003 | Hammarlund et al. ...... 712/200 |

FOREIGN PATENT DOCUMENTS

WO   WO 02/03200 A2   1/2002

OTHER PUBLICATIONS

U.S. Appl. No. 60/355,464.*
Copy of International Search Report as mailed from the EPO on Aug. 12, 2003, for International Application No. PCT/US03/03187, 6 pages.

* cited by examiner

*Primary Examiner*—Henry W. H. Tsai
(74) *Attorney, Agent, or Firm*—Zagorin O'Brien Graham LLP

(57) ABSTRACT

A processor avoids or eliminates repetitive replay conditions and frequent instruction resteering through various techniques including resteering the fetch after the branch instruction retires, and delaying branch resolution. A processor resolves conditional branches and avoids repetitive resteering by delaying branch resolution. The processor has an instruction pipeline with inserted delay in branch condition and replay control pathways. For example, an instruction sequence that includes a load instruction followed by a subtract instruction then a conditional branch, delays branch resolution to allow time for analysis to determine whether the condition branch has resolved correctly. Eliminating incorrect branch resolutions prevents flushing of correctly predicted branches.

15 Claims, 11 Drawing Sheets

Load Dependent Speculation (Data Cache Miss)

| Cycle | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Load[Addr1],%r1 | IS3 | ITX | OP1 | OP2 | EX1 | EX2 | EX3 | H/M | RPL | | | | | |
| Subcc %r1, %r2, %r3 | | | | IS3 | ITX | OP1 | OP2 | EX1 | | RPL | | | | |
| Bne[addr2] | | | | | IS3 | ITX | OP1 | OP2 | EX1 | | RPL | | | |

FIG. 13

Load Dependent Speculation

| Cycle | 0 | 1 | 2 | 3 | 4 | 5 | 6 | 7 | 8 | 9 | 10 | 11 | 12 |
|---|---|---|---|---|---|---|---|---|---|---|---|---|---|
| Load[Addr1],%r1 | IS3 | ITX | OP1 | OP2 | EX1 | EX2 | EX3 | EX1 | XXXX | YYY | ZZZ | | |
| Subcc %r1, %r2, %r3 | | | | IS3 | ITX | OP1 | OP2 | EX1 | | XXXX | YYY | ZZZ | |
| Bne[addr2] | | | | | IS3 | ITX | OP1 | OP2 | EX1 | | XXX | YYY | ZZZ |

FIG. 14

PROCESSOR THAT ELIMINATES MIS-STEERING INSTRUCTION FETCH RESULTING FROM INCORRECT RESOLUTION OF MIS-SPECULATED BRANCH INSTRUCTIONS

CROSS-REFERENCE TO RELATED APPLICATION

This non-provisional patent application claims benefit of U.S. Provisional Application No. 60/355,465, filed Feb. 5, 2002, and naming as inventor Sudarshan Kadambi.

BACKGROUND OF THE INVENTION

1. Field of the Invention

The present invention relates in general to microprocessors and, more particularly, to a system, method, and microprocessor architecture that avoids mis-steering of instruction fetches resulting from mis-speculation in an out-of-order machine.

2. Relevant Background

Basic computer processors such as microprocessors, whether complex instruction set computers (CISC), reduced instruction set computers (RISC), or hybrids, generally include a central processing unit or instruction execution unit that execute a single instruction at a time. Processors have evolved to attain improved performance, extending capabilities of the basic processors by various techniques including pipelining, superpipelining, superscaling, speculative instruction execution, and out-of-order instruction execution.

Pipelined processor architectures divide execution of a single instruction into multiple stages, corresponding to execution steps. Pipelined designs increase instruction execution rate by beginning instruction execution before a previous instruction finishes execution. Superpipelined and extended pipeline architectures further increase performance by dividing each execution pipeline into smaller stages, increasing microinstruction granularity. Superpipelining increases the number of instructions that can execute in the pipeline at one time.

Superscalar processor architectures include multiple pipelines that process instructions in parallel. Superscalar processors typically execute more than one instruction per clock cycle by executing instructions in two or more instruction execution pipelines in parallel. Each of the execution pipelines may have a different number of stages. Some pipelines may be optimized for specialized functions such as integer operations or floating point operations. Other execution pipelines are optimized for processing graphic, multimedia, or complex math instructions.

Superscalar and superpipeline processors increase performance by executing multiple instructions per cycle (IPC). Software programs can be created that exploit instruction-level parallelism (ILP) to increase IPC performance if instructions can be dispatched for execution at a sufficient rate. Unfortunately, some types of instructions inherently limit the rate of instruction dispatch. For example, branch instructions hinder instruction fetching since the branch outcome and the target address are not known with certainty. In the event of a conditional branch both the outcome, whether taken or not taken, and the target address of the instructions following the branch must be predicted to supply those instructions for execution. In the event of an unconditional register-indirect branch, the target address of the instructions following the branch must be predicted to supply those instructions for execution.

Various branch prediction techniques have been developed that predict, with various degrees of accuracy, the outcome of branch instructions, allowing instruction fetching of subsequent instructions based on a predicted outcome. Branch prediction techniques are known that can predict branch outcomes with greater than 95% accuracy. Instructions are "speculatively executed" to allow the processor to proceed while branch resolution is pending. For a correct prediction, speculative execution results are correct results, greatly improving processor speed and efficiency. For an incorrect prediction, completed or partially completed speculative instructions are flushed from the execution pathways and execution of the correct stream of instructions initiated.

Basic processors are generally "in-order" or "sequential" processors and execute instructions in an order determined by the compiled machine-language program running on the processor. Superscalar processors have multiple pipelines that can simultaneously process instructions but only when no data dependencies exist between the instructions in each pipeline. Data dependencies cause one or more pipelines to stall while waiting for the dependent data to become available. Superpipelined processors have additional complications because many instructions exist simultaneously in each pipeline so that the potential quantity of data dependencies is large. Out-of-order processors include multiple pipelines that process instructions in parallel and can attain greater parallelism and higher performance. Out-of-order processing generally supports instruction execution in any efficient order that exploits opportunities for parallel processing that may be provided by the instruction code.

Out-of-order processing greatly improves throughput but at the expense of increased complexity in comparison to simple sequential processors. For example, an out-of-order processor must address the complexity of recovering the processing state following an unpredicted change in instruction flow. At any time during execution many instructions may be in the execution stage, some awaiting scheduling, some executing, and some having completed execution but awaiting retirement. Processor state at the time of the change in instruction flow is to be recovered for execution to continue properly. Specifically, if a change in instruction flow occurs during execution of an instruction, preceding instructions are to proceed to retirement and following instructions are to be discarded. State recovery involves restoring the pipeline to a state that would have existed had the mispredicted instructions not been processed. A challenge for superscalar processors is state recovery following an unexpected change of instruction flow caused by internal or external events such as interrupts, exceptions, and branch instructions.

Out-of-order execution can result in conflicts between instructions attempting to use the same registers, even for instructions are otherwise independent. Instructions may produce two general types of actions when executed: (1) storing results that are directed to an architectural register location, and (2) setting condition codes (CCs) that are directed to one or more architectural condition code registers (CCRs). Results and CC's for an instruction that is speculatively executed cannot be stored in the architectural registers until all conditions existing prior to the instruction are resolved. Temporary storage of speculative results has previously been addressed by a technique called "register renaming" through usage of rename registers, register locations allocated for new results while the registers remain speculative. A similar technique stores the CC set by a speculatively executed instruction. One difficulty with register renaming of conditions codes is that the speculative CC is stored separately from the speculative result, typically resulting in cumbersome operation and slow processor throughput to handle results and set condition codes with precision.

In register renaming, an instruction that attempts to read a value from the original register instead obtains the value of a newly allocated rename register. Hardware renames the original register identifier in the instruction to identify the new register and the correct stored value. The same register identifier in several different instructions may access different hardware registers depending on the locations of the renamed register references with respect to the register assignments. Register renaming typically uses a tracking table having entries for each register in the processor that indicate, among other things, the instruction identification and the particular instruction assigned to the register. The described register renaming method becomes unwieldy for large designs with hundreds or thousands of registers.

Processors with pipelined architectures fetch instructions far in advance of instruction execution. Control transfer instructions alter the sequence of instruction fetches. Since execution of control transfer instructions is downstream of the target instruction fetch, various techniques have been devised to predict the instruction execution path to prevent the pipeline from stalling. The predicted path, also known as the speculative path, is either committed to an architectural state or flushed, depending on the result of branch execution, also known as branch resolution.

SUMMARY OF THE INVENTION

Branch instructions that are directly or indirectly dependent on load instructions can be replayed in several circumstances and conditions including data cache misses, translation lookaside buffer (TLB) misses, read-after-write (RAW) instructions in a memory disambiguation buffer, load miss buffer (LMB) full conditions, and overeager issue conditions. Incorrect branch resolution resulting from speculative branch instruction execution may result in repetitive resteering of instruction fetching and replay of instructions.

A processor avoids or eliminates repetitive replay conditions and frequent instruction resteering through various techniques including resteering the fetch after the branch instruction retires, and delaying branch resolution.

In one embodiment, a processor resolves conditional branches and avoids repetitive resteering by delaying branch resolution. The processor has an instruction pipeline with inserted delay in branch condition and replay control pathways. For example, an instruction sequence that includes a load instruction followed by a subtract instruction then a conditional branch, delays branch resolution to allow time for analysis to determine whether the condition branch has resolved correctly. Eliminating incorrect branch resolutions prevents repetitive resteering of instruction fetching and instruction replays.

The illustrative technique filters incorrect resolutions of correctly predicted conditional branches and penalizes mispredicted branches as little as possible. The technique may be implemented in any deeply pipelined processor, microprocessor, CPU, digital signal processor, sequencer, computational logic, or the like.

In one example, a processor includes an instruction fetch unit (IFU), an instruction scheduling unit, and an execution unit. The execution unit generates a branch resolution signal, indicative of branch taken or not taken, that is passed through a delay to a logic element such as an AND gate. The instruction scheduling unit produces a replay signal indicative of replay or not replay, based on a determination of where the branch instruction is scheduled to be replayed. The replay signal and the delayed branch resolution are combined at the logic element, for example by an AND operation, and passed to the instruction fetch unit to steer or resteer instruction fetching. Accordingly, delay is inserted in a control pathway from the execution unit to the instruction fetch unit.

BRIEF DESCRIPTION OF THE DRAWINGS

Features of the described embodiments believed to be novel are specifically set forth in the appended claims. However, embodiments of the invention relating to both structure and method of operation, may best be understood by referring to the following description and accompanying drawings.

FIG. 13 is a timing diagram showing cycle timing of a load dependent speculation and instruction replay following a data cache miss.

FIG. 14 is a timing diagram showing cycle timing of a load dependent speculation and instruction replay.

DESCRIPTION OF THE EMBODIMENT(S)

Figure 1:
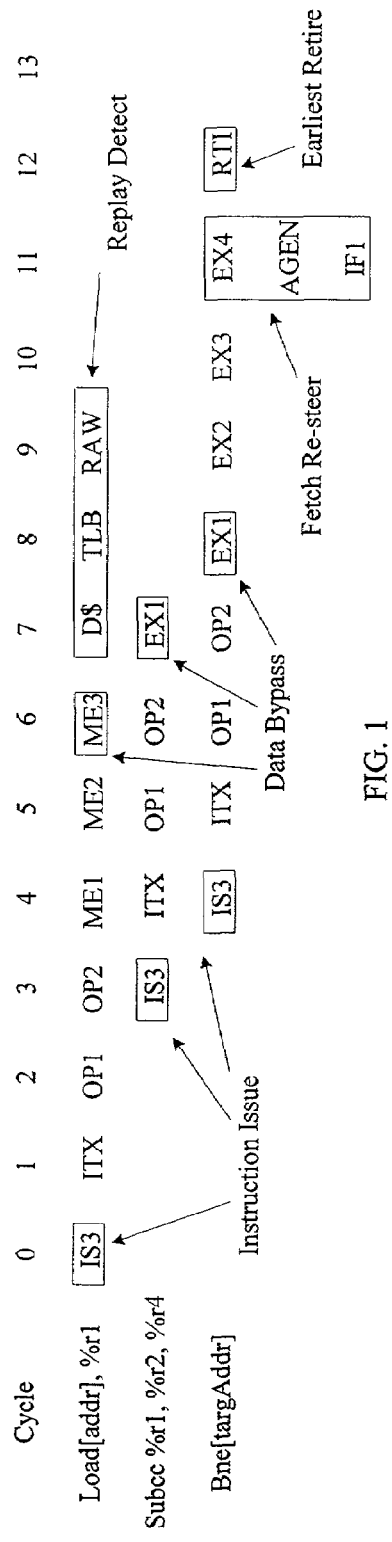
FIG. 1 is a timing diagram that illustrates an example of a branch pipeline during conditional branch resolution.

The following describes the best mode presently contemplated for practicing the invention. The description is not to be taken in a limiting sense but is set forth to convey the general principles of operation and structure of the illustrative embodiments. The issued claims define the invention scope. In the following description, like numerals or reference designators refer to like parts or elements throughout.

Processors with a pipelined architecture fetch instructions far in advance of instruction execution. Control transfer instructions such as branches and jumps alter the path of instruction fetch. The processor can use branch prediction to predict the pathway of instruction execution to prevent stalling of the pipeline.

Compounding the challenges of pipeline architectures, superscalar processors execute instructions out-of-order, adding further complexity to selection of the instruction pathway. For example, a processor may attempt to execute a branch instruction, followed by a speculative load instruction and an add instruction. The load instruction may be speculatively executed before data is available to load. The incorrect data typically generally produces an incorrect result, requiring reissue of the instruction.

Related difficulties occur for branch instructions in which the target branch address is obtained from an operand. If the branch instruction speculative executes before the target branch address is available, the branch can be made to an incorrect address. Branches that are predicted before data is fetched must predict the target branch address.

In an illustrative processor, the speculative path address is predicted for unconditional branches. For conditional branches, the direction of the branch and the target address are predicted. Address mispredictions for program counter-relative branches are resolved after the operation code (opcode) for the branch instruction is fetched from the instruction cache. The target address is computed by adding the program counter to the offset value embedded in the opcode of the instruction. Address mispredictions of non-pc relative branches are resolved after the execution of the instructions since the branch instructions utilize register values for address computation. Branch direction of conditional branches is also resolved after instruction execution because the conditional branches use condition code state to determine branch direction.

Incorrect resolution may occur during speculative branch instruction execution and may result in repetitive resteering of instruction fetching and replay of instructions. For example, loads can be replayed in several circumstances and conditions including data cache misses, translation lookaside buffer misses, read-after-write (RAW) instructions in a memory disambiguation buffer, a load buffer miss (LMB) full condition, and overeager issue conditions. To address repetitive resteering of instruction fetching and instruction replay, a processor can filter incorrect address resolution of non-pc-relative branches and incorrect outcomes of conditional branch instructions when branch conditions are marked for replay.

Referring to FIG. 1, a timing diagram illustrates an example of a branch pipeline during conditional branch resolution. An instruction sequence includes a load instruction Load[addr],%r1, followed by a subtract instruction Subcc %r1, %r2, %r4, then a conditional branch Bne[targAddr]. The load, subtract, and conditional branch instructions are issued (IS3) in cycles 1, 4, and 5, respectively, followed by transmission cycles (ITX). Data is bypassed (ME3) to the load instruction in cycle 7, and bypassed to the subtract and conditional branch instructions (EX1) in cycles 8 and 9, respectively. A load replay is detected in cycles 8, 9, and 10 (D$, TLB, RAW) so that the conditional branch instruction is issued before the load replay is detected. In the illustrative processor, load replays occur in the condition that a data cache does not return data needed for branch resolution (D$), a condition of incorrect translation (TLB) so that the load must be reissued, and a read after write condition (RAW). In case of a replay, data bypassed to the branch (EX1) could be incorrect data. A fetch resteer in cycle 12 (EX4, AGEN, IF1) of the conditional branch occurs if a mismatch occurs between prediction and resolution. Because the data bypassed to the speculatively-issued branch may be incorrect, repetitive resteering of instruction fetching and instruction replays may occur.

Frequent resteering can be avoided using various techniques including: (1) resteering the fetch after the branch instruction retires, and (2) delaying branch resolution.

Figure 2:
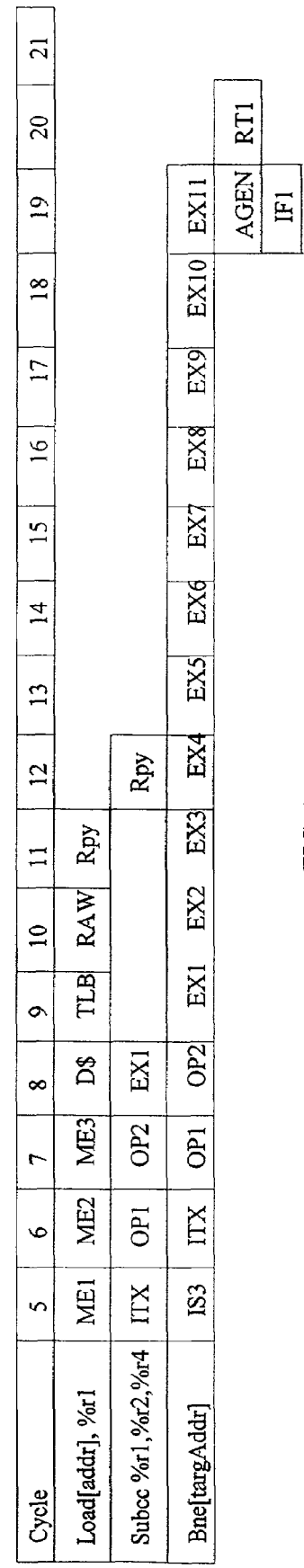
FIG. 2 is a timing diagram illustrating an example of a branch pipeline during conditional branch resolution for a system that avoids repetitive resteering by delaying branch resolution.

Referring to FIG. 2, a timing diagram illustrates an example of a branch pipeline during conditional branch resolution for a system that avoids repetitive resteering by delaying branch resolution. The instruction sequence includes a load instruction Load[addr],%r1, followed by a subtract instruction Subcc %r1, %r2, %r4, then a conditional branch Bne[targAddr]. The load, subtract, and conditional branch instructions are issued (IS3) in cycles 1, 4, and 5, respectively. Data is bypassed (ME3) to the load instruction in cycle 7, and bypassed to the subtract and conditional branch instructions (EX1) in cycles 8 and 9, respectively. Repetitive instruction fetch resteering is avoided by filtering incorrect resolution of branch instructions. Reducing fetch resteering prevents repetitive replays.

In the illustrative example, delaying fetch resteering by five cycles (EX5, EX6, EX7, EX8, EX9) until data is available for resolving branches avoid repetitive replays. In the illustrative example, multiple local reissue conditions (D$, TLB, RAW) are tested and branches resolved for all conditions by delaying branch results by five cycles, ensuring that instruction fetch resteering occurs on correctly resolved branch instructions. The delay allows time for analysis to determine whether the condition branch has resolved correctly.

The illustrative technique avoids incorrect resolutions of correctly predicted conditional branches and penalizes mispredicted branches as little as possible. The technique may be implemented in any deeply pipelined processor, microprocessor, CPU, digital signal processor, sequencer, computational logic, or the like.

Figure 3:
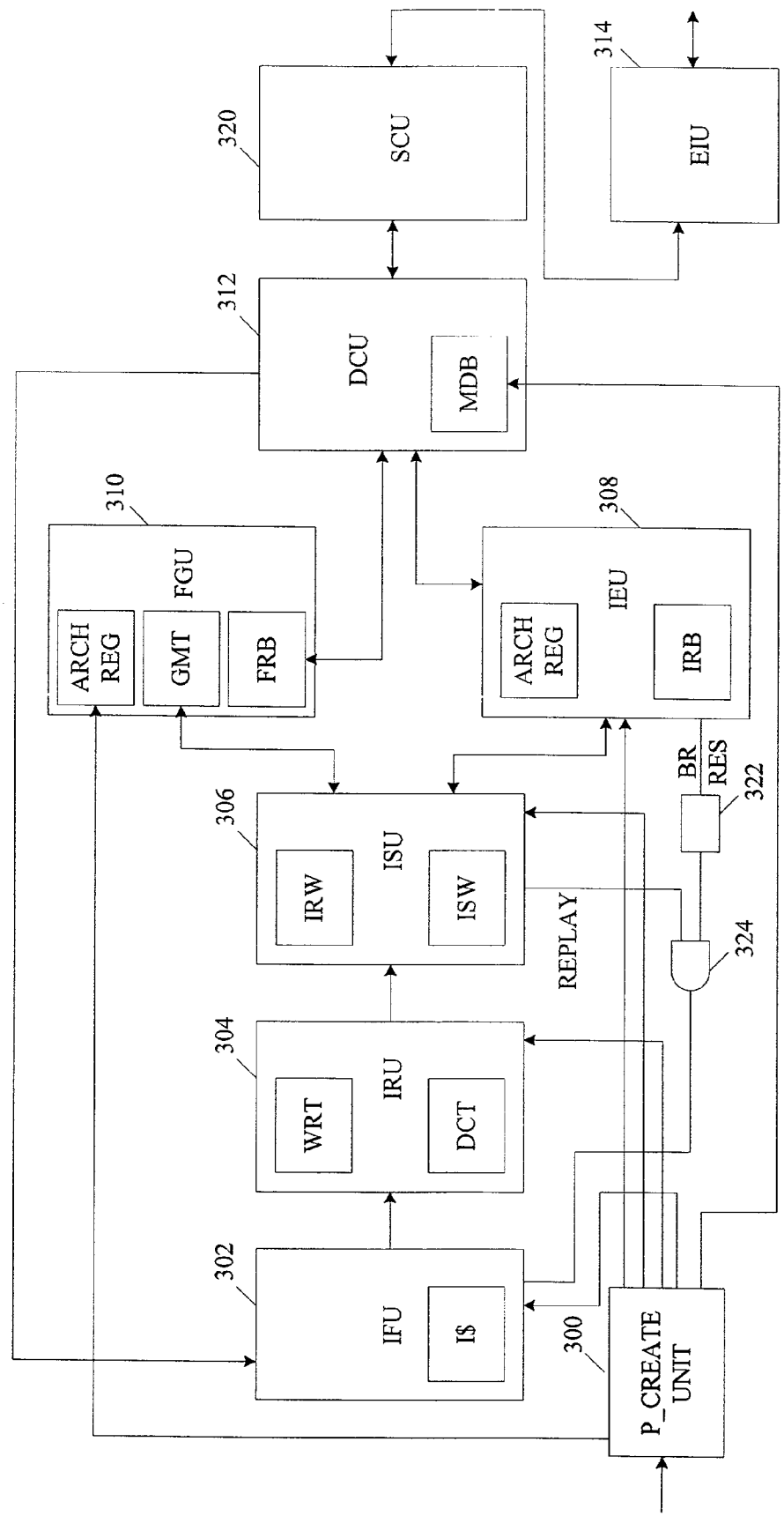
FIG. 3 is a highly schematic block diagram showing functional blocks of a processor with delay feedback interconnections.

One technique for implementing the delay is by inserting a delay element into a signal path, for example from an execution unit that executes branch instructions to an instruction fetch unit. For example, referring to FIG. 3, a highly schematic block diagram illustrates functional blocks of a processor including an instruction fetch unit (IFU) 302, an instruction rename unit (IRU) 304, an instruction scheduling unit (ISU) 306, a data cache 312, a secondary cache 320, an external interface 314, and an execution unit 308. The execution unit 308 generates a branch resolution signal, indicative of branch taken or not taken, that is passed through a delay 322 to a logic element 324 such as an AND gate. The instruction scheduling unit 306 produces a replay signal, indicative of replay or not replay, based on a determination of whether one or more instructions are to be replayed. The replay signal and the delayed branch resolution are combined at the logic element 324, for example by an AND operation, and passed to the instruction fetch unit 302 to steer or resteer instruction fetching. Accordingly, delay is inserted in a control pathway from the execution unit 308 to the instruction fetch unit 302.

Figure 4:
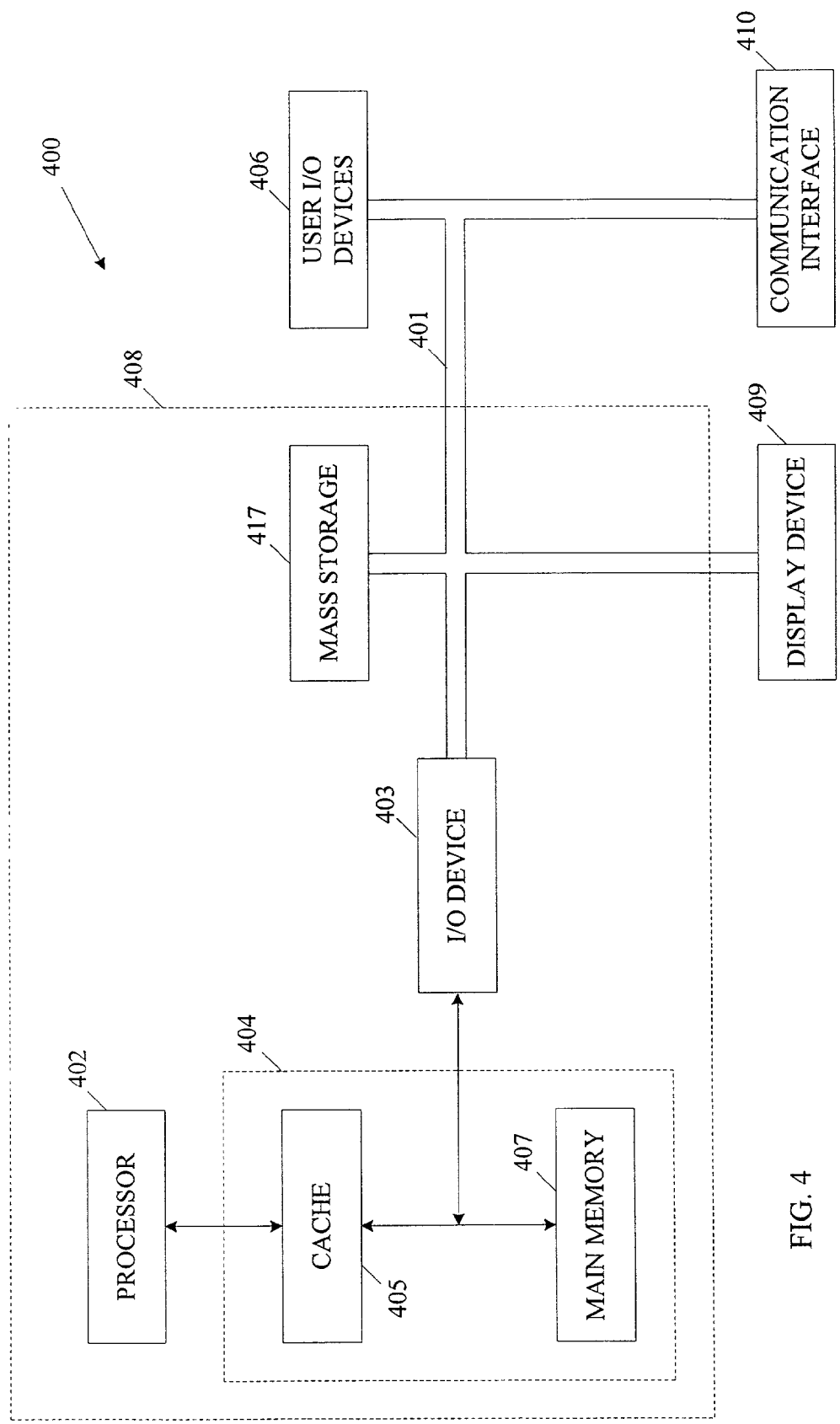
FIG. 4 is a block diagram illustrating a computer system that is suitable for implementing an out-of-order processor that uses a replay scoreboard to reduce mis-speculation.
Figure 5:
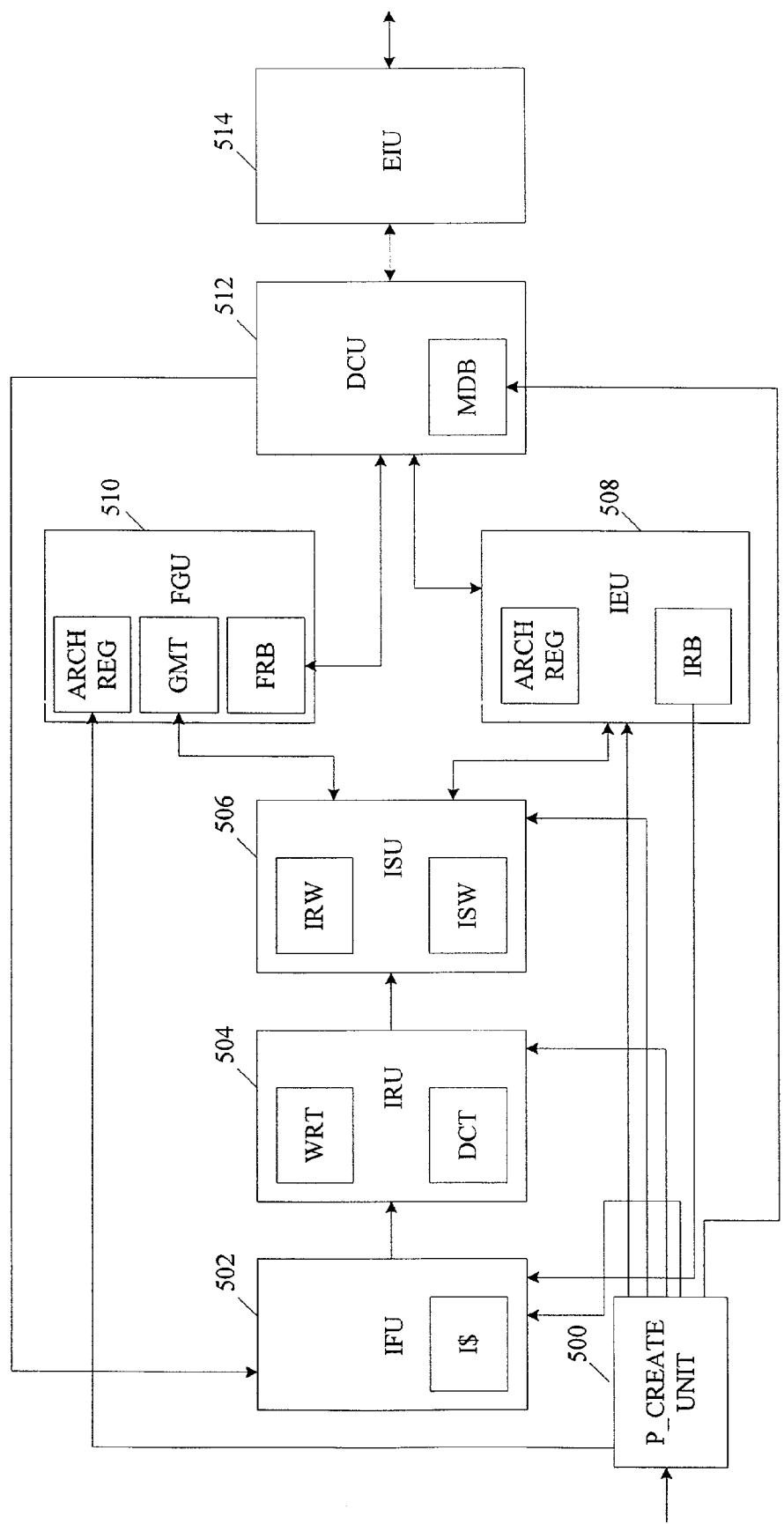
FIG. 5 is a schematic block diagram showing an out-of-order processor that uses a replay scoreboard to reduce mis-speculation.

Referring to FIG. 4 and FIG. 5 respectively, a computer system and processor architecture can be represented as a combination of interacting functional unit. Functional units perform various functions such as storing instruction code, fetching instructions and data from memory, preprocessing fetched instructions, scheduling instructions for subsequent execution, executing the instructions, managing memory transactions, and interfacing with external circuitry and devices.

In the illustrative example, a superpipelined and superscalar processor 402 represents implementations with high clock frequency operation and capability to issue and execute multiple instructions per cycle (IPC), although inventive features may be usefully embodied in various alternative processor architectures. Accordingly, the alternative embodiments are equivalent to the particular embodiments shown and described herein.

Referring to FIG. 4, a typical general purpose computer system 400 includes a processor 402 that processes data and executes instructions, an address/data bus 401 for communicating information, and an input/output (I/O) device 403 coupling processor 402 with bus 401. A memory system 404 couples with bus 401 for storing information and instructions for processor 402. Memory system 404 comprises, for example, cache memory 405 and main memory 407. Cache memory 405 includes one or more levels of cache memory. In a typical implementation, processor 402, I/O device 403, and some or all of cache memory 405 may be integrated in a single integrated circuit, although the specific components and integration density are a matter of design choice selected to meet the needs of a particular application.

User I/O devices 406 are coupled to bus 401 and can communicate information in appropriately structured form with other functional blocks of computer system 400. User I/O devices typically include a keyboard, mouse, card reader, magnetic or paper tape, magnetic disk, optical disk, or other available input devices. A user I/O device may be another computer. Mass storage device 417 is coupled to bus 401 and may be implemented using one or more magnetic hard disks, magnetic tapes, CDROMs, large banks of random access memory, or the like. A wide variety of random access and read only memory technologies are available and are equivalent for purposes of the described processor. Mass storage 417 may store computer programs and data. Some or all of mass storage 417 may be configured for incorporation as part of memory system 404.

In a typical computer system 400, processor 402, I/O device 403, memory system 404, and mass storage device 417 are coupled to bus 401 formed on a printed circuit board and integrated into a single housing 408 designated by a dashed-line box. Particular components that are selected for integration into a single housing are based upon market and design choices. Accordingly, fewer or more devices may be incorporated within the housing 408.

Display device 409 can display messages, data, a graphical or command line user interface, or other user communications. Display device 409 may be implemented, for example, by a cathode ray tube (CRT) monitor, liquid crystal display (LCD), or other devices with display functionality.

FIG. 5 illustrates fundamental components of processor 402 with additional detail. Processor 402 may be implemented with more or fewer functional units and retain the benefits of the described system. The illustrative functional units are identified using a precise nomenclature for ease of description and understanding, but other nomenclature is often used by various manufacturers to identify equivalent functional units.

Unlike conventional multiprocessor architectures, the illustrative computer system 400 may be implemented as a single circuit on a single integrated circuit chip so that individual processors are not only closely coupled, but are in essence merged to efficiently share resources among processors. Resource sharing reduces communication overhead problems inherent in other multiprocessor designs. For example, memory including all levels of the cache subsystem, are efficiently shared among the multiple processors, ensuring cache coherency. While additionally exploiting resource sharing, the illustrative multiprocessor configuration achieves similar performance as conventional multiprocessing architectures by enabling independent threads and processes to execute independently and in parallel.

A processor create unit 500 is coupled to receive a processor create instruction from either a computer operating system, a running application, or through a hardware control line (not shown). In a specific example, a SPARC V9 instruction architecture supports the processor create instruction as a privileged command that is limited to issue only by the operating system. The processor create instruction instructs processor 402 to configure as a uniprocessor or as one of a number of multiprocessor configurations by specifying the number of virtual processors or strands.

In a specific example, one strand is created for each thread or process in the instruction code. Thus, the operating system, application, or other source can determine that the current instruction code will execute more efficiently in a multiprocessor of n-processors, and issue the processor create instruction to instantiate n strands to execute the code. The configuration may change dynamically in response to commencement of new applications or spawning a new thread by a running application.

Instruction fetch unit (IFU) 502 performs instruction fetch operations and comprises an instruction cache (I$) for storing instructions, branch prediction logic, and address logic for addressing selected instructions in the instruction cache. Instruction cache (I$) is a portion, along with a data cache portion, of a level one (L1), Harvard-architecture cache. Other cache organizations, such as unified cache structures, may be alternatively substituted. Substitutions will result in a predictable performance impact.

Figure 6:
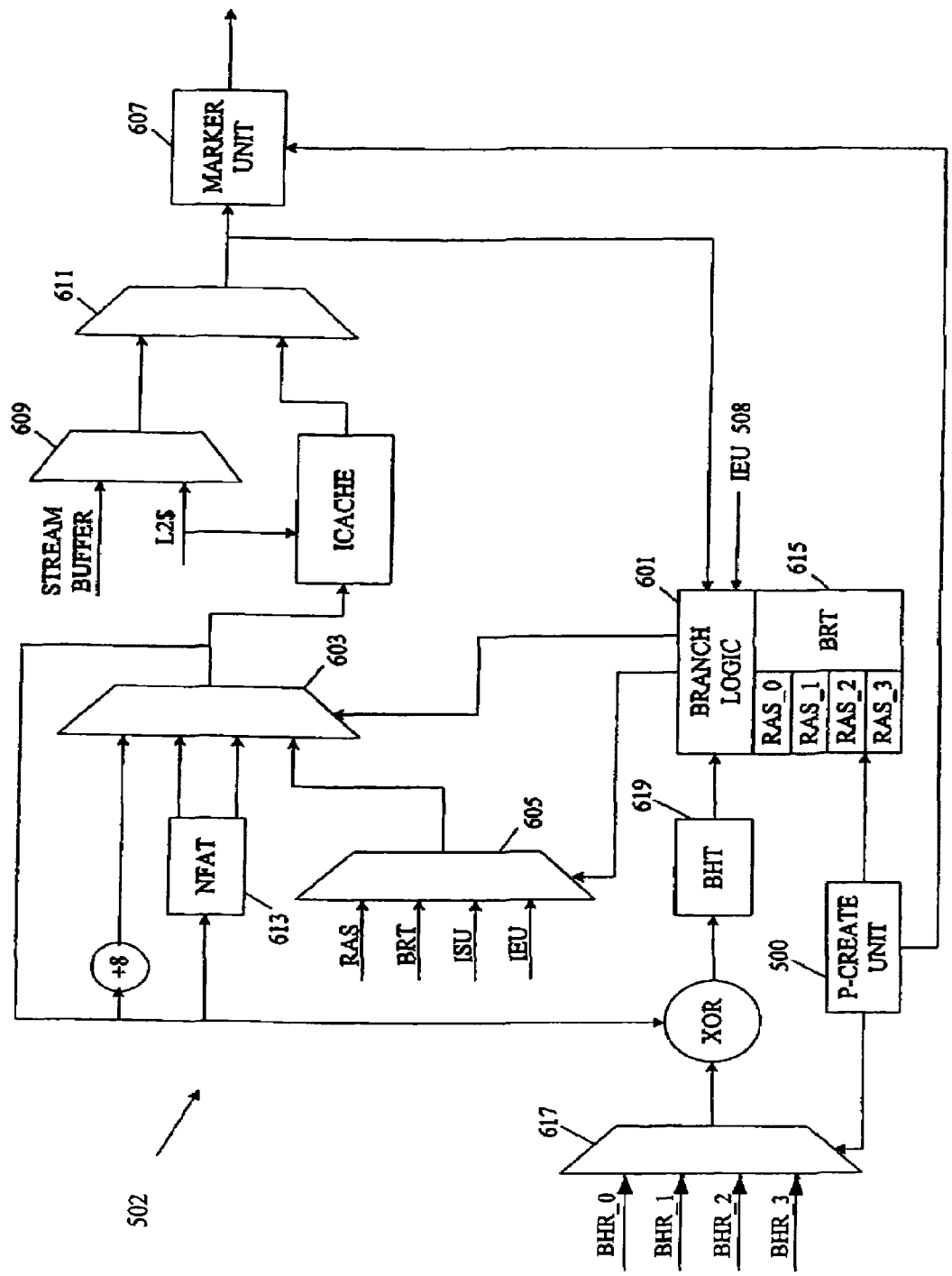
FIG. 6 is a block diagram illustrating an instruction fetch unit of the out-of-order processor shown in FIG. 5.

Referring to FIG. 6, instruction fetch unit 502 fetches one or more instructions each clock cycle by appropriately addressing the instruction cache via multiplexers MUX 603 and MUX 605 under control of branch logic 601. In the absence of a conditional branch instruction, instruction fetch unit 502 addresses the instruction cache sequentially. Fetched instructions are passed to instruction rename unit 504 shown in FIG. 5. Any fetch bundle may include multiple control-flow instructions, for example conditional or unconditional branches. Hence, instruction fetch unit 502 bases the next fetch address decision upon the simultaneously predicted outcomes of multiple branch instructions.

Referring again to FIG. 6, branch prediction logic 601 handles branch instructions, including unconditional branches. An outcome for each branch instruction is predicted using any of a variety of available branch prediction algorithms and techniques. In one embodiment, branch prediction logic 601 performs an exclusive-OR operation on the current address and a value from a selected branch history register (BHR) to generate an index to a branch history table (BHT) 619. To implement a multiprocessor, individual virtual processors have a unique branch history register. In the example of the illustrative four-processor implementation, four branch history register input terminals are shown as BHR-0, BHR-1, BHR-2, and BHR-3.

Each active branch history register stores information about the outcomes of a preselected number of most-recently executed condition and unconditional branch instructions for a particular active virtual processor. For virtual processors in a dead state, the BHR value is a don't-care value. An outcome can be represented in binary as taken or not taken. Each active branch history register comprises an n-bit value representing outcomes of n most-recently executed branch instructions.

Processor create unit 500 selects one active branch history register (BHR) using multiplexor 617. One branch history register is selected at a time, and processor create unit 500 selects the particular branch history register in a round-robin fashion each clock cycle from the virtual processors that are in an active state. If only one processor is active, only BHR-0 is selected. Each branch history register stores the outcomes, whether taken or not taken, for a plurality of most-recently executed conditional and unconditional branch instructions occurring on a processor-by-processor basis. When a conditional branch instruction is predicted, the predicted outcome is used to speculatively update the appropriate branch history register so that the outcome is part of the information used by the next BHT access for that virtual processor. When a branch is mispredicted, the appropriate branch history register is repaired by transferring the BHR VALUE from a branch repair table (BRT) 615 along actual outcome of the mispredicted branch. The repair table value and the actual outcome are loaded into the branch history register corresponding to the virtual processor on which the branch instruction occurred.

Next fetch address table (NFAT) 613 determines the next fetch address based upon the current fetch address received from the output of multiplexer 603. In the illustrative example, NFAT 613 may have 2048 entries, each with two multiple-bit values corresponding to a predicted next fetch address for instructions in two halves of the current fetch bundle. Two bits of the multiple-bit values encode set prediction for the next fetch, while remaining bits encode an index into the instruction cache (I$) and set a cache line offset.

A branch repair table (BRT) 615 has entries or slots for a plurality of unresolved branch instructions. Branch repair table (BRT) 615 determines when a branch is mispredicted based upon information from an execution unit such as integer execution unit (IEU) 508. Branch repair table 615, operating through branch logic 601, redirects instruction fetch unit 502 through the correct branch path. Each entry in branch repair table 615 has multiple fields. Branch taken fields such as BT ADDRESS-1 through BT ADDRESS-N store an address or program counter value for the first fetch bundle in the branch instruction's predicted path. Branch not taken fields such as BNT ADDRESS-1 through BNT ADDRESS N store an address for the first fetch bundle in a path not taken by the branch instruction. A branch history table (BHT) index such as BHT INDEX-1 through BHT INDEX-N points to a location in the branch history table that was used to predict the branch instruction. The BHR VALUE and BHT VALUE fields store values of the BHR and BHT, respectively, at the time of prediction of a branch instruction.

Branch history table (BHT) 619 holds a plurality of multiple-bit values. In the illustrative example, branch history table 619 holds two-bit values that produce acceptable results. Branch history table 619 is indexed by computing an exclusive-or operation of the selected BHR value with the current fetch address taken from the output of multiplexer 603. In a specific example, the seventeen least significant bits of the current address are used in the exclusive-OR (XOR) computation, excluding the two most-least significant bits which are always 0's in a byte addressed processor with 32-bit instructions, to match the 17-bit values in each branch history register. The XOR computation generates a 17-bit index that selects one entry in the branch history table. The 17-bit index enables selection from up to $2^{17}$ or 128K locations in branch history table 619. One branch history table 619 may be shared among any number of virtual processors.

Once a branch is resolved, the path address of the actually followed branch is communicated from the integer execution unit 508 and compared against the predicted path address stored in the BT ADDRESS fields. If the compared addresses differ, the instructions down the mispredicted path are flushed from the processor and instruction fetch unit 502 redirects instruction fetch down the correct path identified in the BNT ADDRESS field using the branch repair table signal to multiplexer 605. Once a branch is resolved, the branch history table value is updated using the branch history table index and branch history table value stored in branch repair table 615. In the illustrative example, each entry in branch history table 619 is a two-bit saturating counter. When a predicted branch is resolved taken, the entry used to predict the outcome is incremented. When a predicted branch is resolved not taken, the entry in branch history table 619 is decremented.

Alternative branch prediction algorithms and techniques may be used so long as resources are duplicated on a processor-by-processor basis for resources that are used exclusively by a particular processor.

Fields in branch repair table 615 may include a thread identifier field to identify the virtual processor that executes the branch instruction assigned to a particular slot. The branch repair table 615 is shared among all of the virtual processors and requires little modification to support dynamically configurable uniprocessing and multiprocessing.

Other resources in the instruction fetch unit 502 that are duplicated for individual virtual processors are the return address stack (RAS) labeled RAS-0 through RAS-3 in FIG. 6. Each return address stack comprises a last in, first out (LIFO) stack in a particular example that stores the return addresses of a plurality of most-recently executed branch and link instructions. The instructions cooperate with a subsequent RETURN instruction that redirects processing back to a point immediately following the fetch address initiating the branch or link instruction. When an instruction cooperating with a subsequent RETURN is executed, such as a CALL or JMPL instruction in the SPARC V9 architecture, the current program counter is pushed onto a selected one of RAS-0 through RAS-3. The return address stack is maintained on a processor-by-processor, for example thread-by-thread, basis to ensure return to the proper location.

When a subsequent RETURN instruction executes, the program counter value on top of the return address stack is popped and selected by appropriately controlling multiplexor 605, causing instruction fetch unit 502 to begin fetching at the RAS-specified address. The RETURN instruction is allocated an entry in branch repair table 615 and a fall-through address is stored in the BNT ADDRESS field corresponding to the entry. If the RETURN instruction is mispredicted, the fall-through path is unlikely to be the path the RETURN should follow and instruction fetch unit 502 should be redirected via an address computed by integer execution unit 508 and applied to the integer execution unit signal to multiplexor 605.

Instruction fetch unit 502 includes instruction marker circuitry 607 for analyzing fetched instructions to determine selected information about the instructions. Marker unit 607 is also coupled to processor create unit 500. The selected information including the thread identification generated by processor create unit 500, for example the virtual processor identification, is referred to herein as "instruction metadata". In an illustrative example, each fetch bundle is tagged with a thread identification for use by downstream functional units. Other metadata comprises information about instruction complexity and downstream resources that are required to execute the instruction. The term "execution resources" refers to architectural register space, rename register space, table space, decoding stage resources, and the like that is committed within processor 402 to execute the instruction. Metadata can be generated by processor create unit 500 or dedicated combinatorial logic that supplies metadata in response to the instruction op-code input. Alternatively, a look-up table or content addressable memory can be used to obtain metadata In a typical application, instruction metadata comprises from two to eight bits of information that is associated with each instruction.

Instruction fetch unit 502 is described herein as supporting dynamically configurable multiprocessing in terms of a specific processor capable of implementing one, two, three, or four virtual processors in a single processor unit. Alternatively, n-way multitbreading can be achieved by modifying instruction fetch unit 502 to fetch instructions from n different streams or threads on a round-robin or thread-by-thread basis each cycle. Because each fetch bundle includes instructions from one thread, modifications to support dynamically configurable multitbreading can be implemented with a modest increase in hardware size and complexity. Generally any state information that is to be tracked on a per-processor or per-thread basis is duplicated. Other resources and information can be shared among virtual processors. The branch history register tracks branch outcomes within a single thread of execution so one copy of the branch history register supports each thread. Similarly, the return address stack tracks return addresses for a single thread of execution and so one copy of the return address stack supports each thread.

Remaining functional units shown in FIG. 5 are herein termed "downstream" functional units although instructions and data flow bi-directionally between the remaining functional units. Some or all downstream functional units have resources that may be effectively shared among multiprocessors. One benefit is that downstream functional units do not require complete duplication to enable multiprocessor functionality. Another benefit is that several functional units include resources that can be dynamically shared thereby enabling "on-the-fly" reconfiguration from a uniprocessor mode to any of a number of multiprocessor modes.

Figure 7:
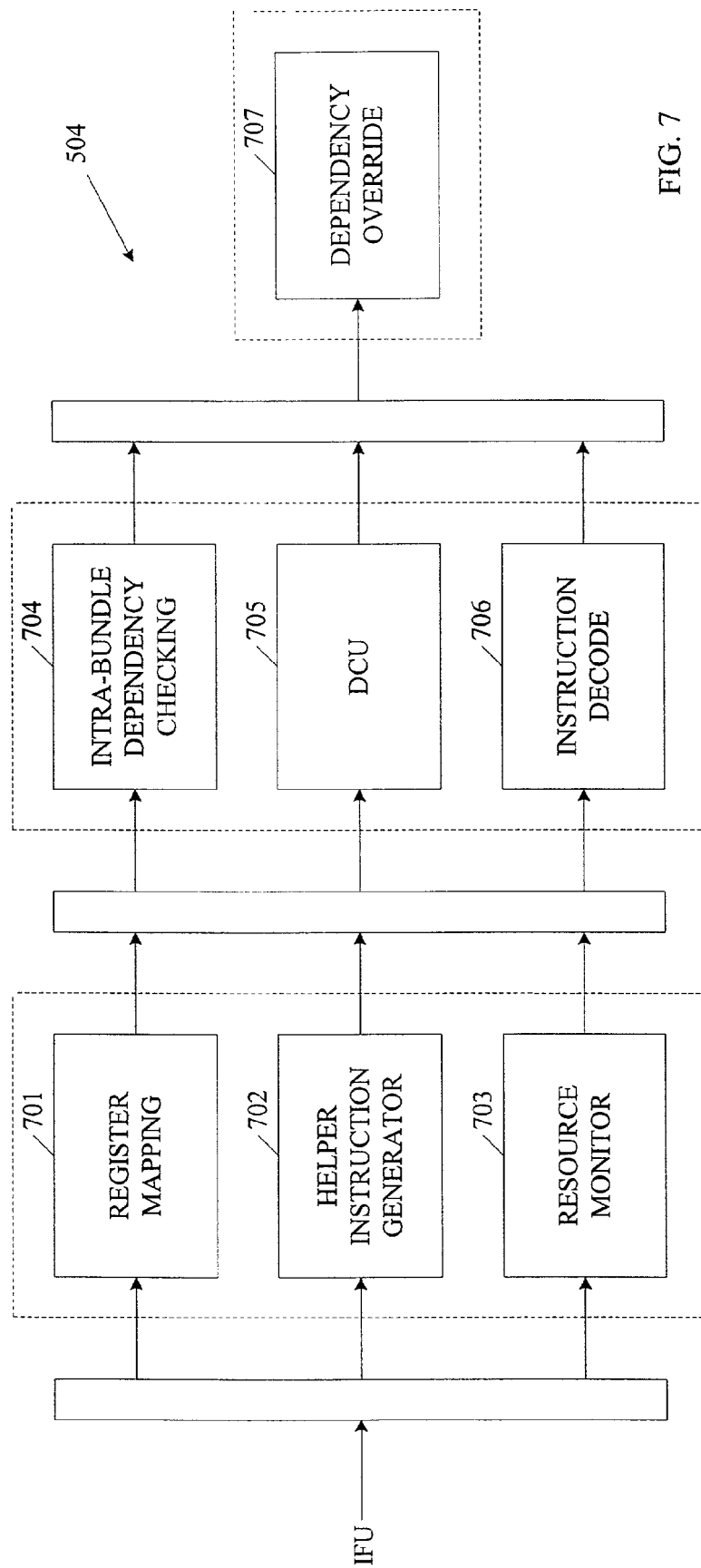
FIG. 7 is a schematic block diagram that depicts an instruction rename unit of the out-of-order processor shown in FIG. 5.

Referring to FIG. 7, instruction rename unit (IRU) 504 comprises one or more pipeline stages, depicted by dashed line boxes, that include instruction renaming and dependency checking elements. Inter-bundle dependency checking is relaxed because bundles from different threads are inherently independent.

Register mapping unit 701 implements logic for handling rename registers in a register window-type architecture such as the SPARC-V9 instruction architecture. A flat view of the entire register file set is used to order dependency checking across a 128-entry window of instructions so that all register fields are collapsed by register mapping unit 701 into a single register address space. In the illustrative SPARC-V9 compliant system, register mapping unit 701 manages 160 integer registers and 64 floating point registers.

Helper instruction generator 702 handles complex instructions with more than two source operands. Helper instruction generator arranges complex instructions into a plurality of simple instructions. Each simple instruction generated by helper instruction generator 702 maintains a thread identification associated with the parent complex instruction. Helper instruction generator 702 supports dynamically configurable multiprocessing.

Resource monitor unit 703 tracks global resources in the multiple various functional units of processor 402. Resource tracking controllably stalls processor 402 if event resources are expended in a particular functional unit.

Intra-bundle dependency checking unit 704 checks dependency within a bundle or group of eight incoming instructions. Dependency override unit 707 enables any reported dependencies within an incoming bundle, determined by unit 704, to override dependencies reported by dependency checking unit 705.

Dependency checking unit 705 is a dependency checking table or inverse mapping table. The dependency checking table includes an entry or slot for each live instruction in the machine. The dependency checking element, called an inverse map table (IMT) or dependency checking table (DCT) in a specific example, analyzes the instructions to determine whether operands identified by the instructions' register specifiers cannot be determined until another live instruction has completed. A particular embodiment of an inverse map table is described in greater detail in U.S. Pat. No. 5,898,853 titled "APPARATUS FOR ENFORCING TRUE DEPENDENCIES IN AN OUT OF ORDER PROCESSOR" by Ramesh Panwar and Dani Y. Dakhil. Inverse map table maps register specifiers in the instructions to physical register locations and performs register renaming to prevent dependencies. Instruction rename unit 504 supplies renamed instructions to instruction scheduling unit (ISU) 506.

In a particular example, processor 402 supports 128 live instructions so that dependency checking unit 705 includes 128 entries or slots. Each instruction entry in dependency checking unit 705 comprises a plurality of fields. Fields in dependency checking unit 705 include a destination register (rd) and a condition code (CC) field. The rd and CC fields are only active when the instruction corresponding to the entry produces an rd-value or a CC-value and is the most recent producer of that value. In a particular example, rd is an 8bit (or more) identifier or pointer to a register having a value produced by the instruction. The CC-value is a three-bit (or more) condition code identifier the instruction produces.

The dependency scoreboard is an N×N table of producers and consumers. Each entry or slot can be a binary storage, for example that can be set to "1" if a particular instruction is dependent on a producer. For example, a load miss in the data cache can send an instruction identifier to a decoder to trigger replay by the producer and communicate to all consumers of the load, causing replay of all dependent instructions.

The dependency checking unit 705 compares source fields (rs1 and rs2) of all eight incoming instructions against the destination register field for an entry or slot. If a match occurs, the entry broadcasts the entry address on to the corresponding bus through a simple encoder. The broadcast address is called a producer identifier (PID). Instruction scheduling unit 506 uses the producer identifier (PID) to determine the ready status of waiting instructions. The dependency checking unit also compares CC fields of the eight incoming instructions and the CC field of the entry.

The rd-encoder and the CC-encoder can be shared in an instruction set such as the SPARC-V9 instruction architecture in which no instructions have both a CC-dependency and an RD-dependency. To enable sharing, certain instructions must have operands rearranged. The rd and CC-fields of each entry are written when new instructions are loaded into the dependency table. For rd values, eight bits are written into the entry along with the most recent bit, which describes whether the entry is the latest producer of a particular register. For CC-values three bits are written into the entry, along with the most recent bit for the CC field.

When a branch instruction is resolved and the predicted direction subsequently is proved incorrect, the prefetched instructions following the instruction within the same thread or virtual processor is flushed from the scheduling window and dependency checking table. Fetching into the window resumes at the position following the mispredicted branch, as described hereinbefore with respect to instruction fetch unit 502. However, flushed instructions may have been taken over as being most recent producers of certain registers in the machine. Two techniques are used to handle the situation. One, fetching into the window resumes with scheduling of the new instructions prevented until all previous instructions are retired from the window. Alternatively, the most recent producer information rewinds within the dependency table so that less recent instructions are reactivated as appropriate.

Each entry in the dependency checking table is tagged with a two-bit thread ID to identify the instruction's thread. Each bundle of incoming instructions can only belong to one thread so that only entries containing the incoming thread's instructions are considered. On a flush, entries belonging to only the thread that suffered the branch mispredict are eliminated from the dependency checking table while entries corresponding to the other threads stay resident in the dependency checking table. Hence, the flush information that is broadcast by integer execution unit 508 has to contain the thread identifier of the mispredicted branch.

Instruction rename unit 504 further comprises a window repair table (WRT) that stores status information about register window instructions for usage to restore the state of register windows after a branch misprediction. In one example, the window repair table includes thirty-two entries or slots, each entry comprising one or more fields of information. The number of window repair table entries may be more or less depending on the particular application. The window repair table can be shared among multiprocessors. The window repair table is not needed in a processor that does not use register widows.

Instruction scheduling unit (ISU) 506 schedules and dispatches instructions into an appropriate execution unit as soon as instruction dependencies are satisfied. In the illustrative example, execution units include integer execution unit (IEU) 508 and floating point and graphics unit (FGU) 510. Instruction scheduling unit 506 also maintains trap status of live instructions. Instruction scheduling unit 506 may perform other functions such as maintaining the correct architectural state of processor 402, including state maintenance during out-of-order instruction processing. Instruction scheduling unit 506 may include elements to redirect execution appropriately when traps or interrupts occur and to ensure efficient execution of multiple threads during multiple threaded operation. For multiple thread operation, processor 402 runs multiple substantially-independent processes simultaneously.

Instruction scheduling unit 506 also retires executed instructions when completed by integer execution unit 508 and floating point and graphics unit 510. Instruction scheduling unit 506 assigns each live instruction a position or slot in an instruction retirement window (IRW). In a specific embodiment, the instruction retirement window includes one slot for every live instruction. Instruction scheduling unit 506 performs appropriate updates to architectural register files and condition code registers upon complete execution of an instruction. Instruction scheduling unit 506 is responsive to exception conditions and discards or flushes operations performed on instructions subsequent to an instruction that generates an exception in the program order. Instruction scheduling unit 506 quickly removes instructions from a mispredicted branch and instructs instruction fetch unit 502 to fetch from the correct branch. An instruction is retired when execution is complete both for the instruction and for all instructions that depend from the retiring instruction. Upon retirement the instruction's result is written into the appropriate register file and is no longer a "live" instruction.

Figure 8:
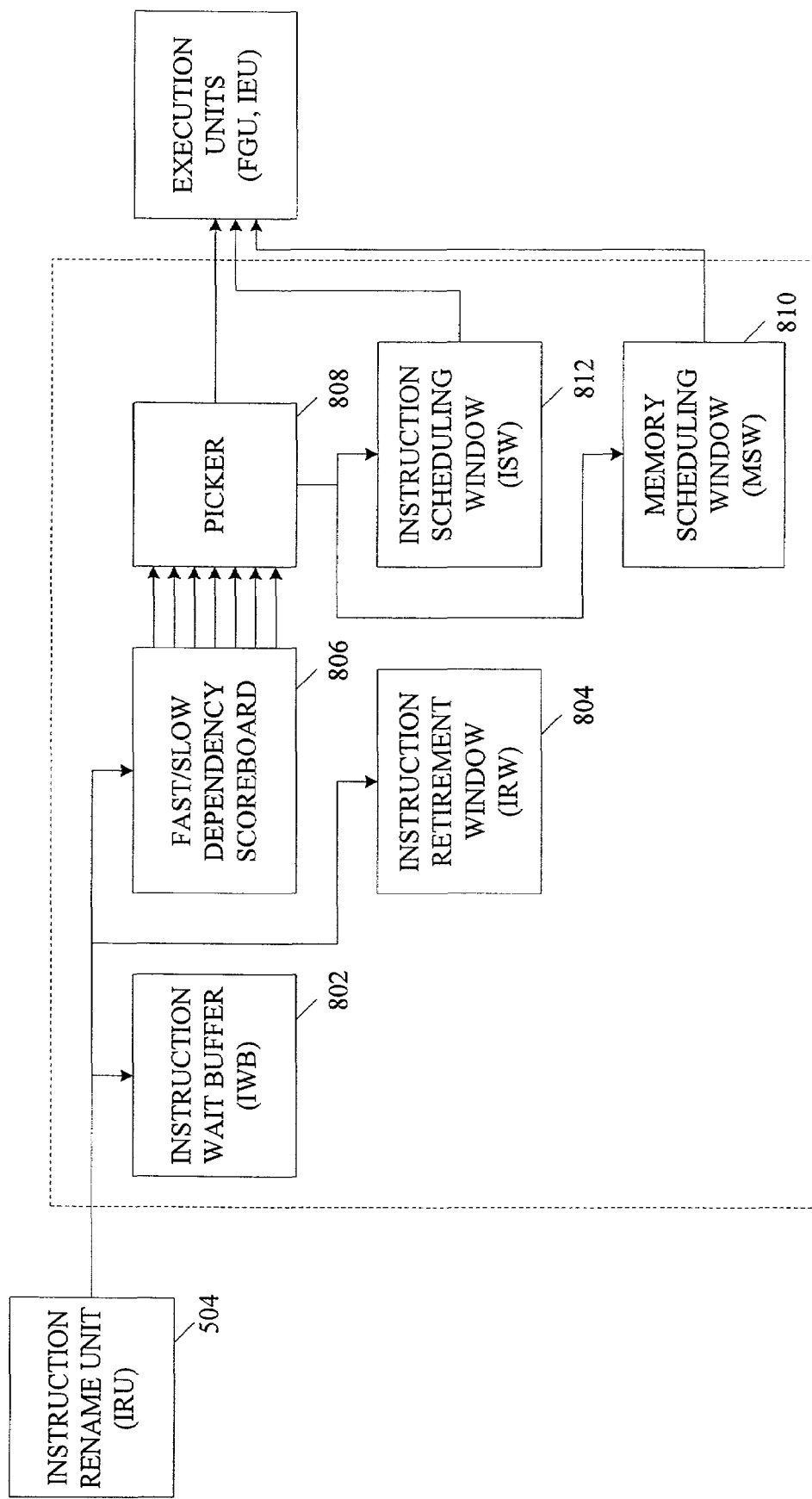
FIG. 8 is a schematic block diagram showing an instruction scheduling unit that is suitable for usage in the out-of-order processor illustrated in FIG. 5.

Referring to FIG. 8, a suitable implementation of an instruction scheduling unit (ISU) 506 is shown. The instruction scheduling unit 506 comprises multiple functional blocks including, but not limited to, an instruction wait buffer (IWB) 802, an instruction retirement window (IRW) 804, a dependency scoreboard 806, a picker 808, a memory scheduling window (MSW) 810, and an instruction scheduling window (ISW) 812. The instruction scheduling unit 506 performs functions that are generally related to functions of a reorder buffer, as known to those having ordinary skill in the art.

A dependency scoreboard useful in an out-of-order processor to determine when an instruction is ready for execution. For an instruction to be ready for execution, operands must be available for execution so that data values are known and accessible for computations, logical operations, or data storage. Operands, when available, are marked for issue and sent to an instruction execution unit via the picker 808. The dependency scoreboard 806, which may also be termed a replay scoreboard, tracks available and non-available operands.

The dependency scoreboard 806 is an array that supplies storage for a plurality of "in-flight" instructions, instructions that are currently scheduled for execution. The dependency scoreboard 806 Each in-flight instruction is allocated storage for the other in-flight instructions to account for any possible dependencies. In one example, the dependency scoreboard 806 is a random access memory structure containing 128× 128 cells to track 128 in-flight instructions. In the example, each cell is a single bit with available operands designated by a logical "1" value stored in the scoreboard, and non-available operands by a logical "0". Accordingly, the dependency scoreboard 806 signifies whether an instruction's operands are dependent on a particular in-flight instruction.

The processor architecture, including the instruction set, defines the number of register operands that may be specified for a particular instruction. For example, in the SPARC-V9 architecture, an instruction may specify up to five operands so that up to five bits may be asserted.

The illustrative dependency scoreboard 806 includes both a fast scoreboard and a slow scoreboard.

The picker 808 picks valid entries from a memory scheduling window 810 by pointing to an entry that is picked and applying the address contained in the entry to a cache (not shown), for example a first cache level. In an illustrative system, the picker 808 selects the entry in a free-running mode regardless of whether the accesses hit in the first cache level. A second cache level may be included to receive accesses missed in the first cache level.

The memory scheduling window 810 is a storage with a plurality of entries. In one example, the memory scheduling window 810 entries include storage elements for holding a window identifier (ID). The window IDs are supplied by the instruction scheduling window (ISW) 812 for each integer load operation. The window ID selected by picker 808 notifies instruction scheduling unit 506 that the load identified by the filed window ID should be replayed so that the index of the load is available at level one data caches when data is supplied by the level 2 cache. An integer load that misses in the data cache is tagged with a window ID and a response is due for all outstanding loads at the instruction scheduling unit 506. Up to two integer loads can be received each clock cycle, therefor picker 808 can send up to two window IDs to instruction scheduling unit 506.

Picker 808 selects valid entries from memory scheduling window 810 for accessing the L2 cache and directs the access request within each entry to an appropriate address port (not shown).

In the illustrative system, picker 808 is directed to stall, for example to stop presenting addresses to the level 2 cache, for a limited number of reasons. For example, picker 808 is stalled by an idle condition. An idle condition exists when picker 808 and an insert pointer address equivalent entries in memory scheduling window 810, and memory scheduling window 810 contains no valid entries.

Another stall condition occurs when the current entry designated by picker 808 comprises two data cache entries and the two data cache entries refer to different cache lines. A cache line mismatch can occur when two or more data cache references per clock cycle are generated by integer execution unit 508. If so, picker 808 stalls for one cycle so that the two data cache entries are removed in two subsequent cycles.

Picker 808 is also stalled when an entry created for floating point and graphics unit 810 has more than one valid address and a bank conflict is detected. Picker 808 stalls until all four accesses are complete.

Another stall condition exists when an entry that picker 808 is about to select has a transit hazard. The stall conditions occur in response to optional camming checks, rather than to status, for example hit or miss, of the access into the L2 cache.

Instruction scheduling unit 506 also retires instructions on execution completion by integer execution unit 508 and floating point and graphics unit 510. Instruction scheduling unit 506 assigns a position or slot in an instruction retirement window (IRW) 804 to an active (in-flight) instruction. In a specific embodiment, the instruction retirement window 804 includes one slot for every live instruction. Instruction scheduling unit 506 appropriately updates architectural register files and condition code registers upon complete instruction execution. Instruction scheduling unit 506 responds to exception conditions by discarding or flushing operations performed on instructions subsequent to an instruction that generates an exception in the program order. Instruction scheduling unit 506 quickly removes instructions from a mispredicted branch and instructs instruction fetch unit 502 to fetch from the correct branch. An instruction is retired when execution is complete and all other instructions that depend from the retiring instruction have completed. Upon retirement the instruction's result is written into the appropriate register file and the instruction is no longer "live" or "in-flight."

Instruction scheduling unit 506 receives renamed instructions from instruction rename unit 504 and registers the instructions for execution by assigning a position or slot in an instruction scheduling window 812 to each instruction. In a specific embodiment, instruction scheduling window 812 includes one slot (not shown) for every live instruction. The individual entries in the instruction scheduling window 812 are respectively associated with an entry in an instruction wait buffer (IWB) 802 by an IWB pointer (not shown). An entry includes a thread ID field that supplies a thread identification. PID fields of the instruction scheduling window entry encodes dependency information about the instruction. Metadata such as an instruction identification, ready status, and latency information, are stored in a metadata field of each entry. Status information, including instruction latency, is stored in a status field. The instruction picker 808 devices pick instructions from the instruction scheduling unit 506 that are ready for execution by generating appropriate word line signals for the instruction wait buffer and issuing the instruction to the execution units.

The instruction is issued to an execution unit such as integer execution unit 508 or floating point and graphics unit 510 with instruction information including both a thread identification and an instruction identification. Thread and instruction identification permit integer execution unit 508 or floating point and graphics unit 510 to respond with trap and completion status on an instruction-by-instruction basis. When the trap and completion status of an instruction arrives from integer execution unit 508 or floating point and graphics unit 510, the information is written to an instruction retirement window 804. Retirement logic (not shown) examines contiguous entries in instruction retirement window 804 and retires the entries in the order of issue to properly update the architectural state.

Instructions can be removed from the execution pipelines in ways other than retirement by pipeline flushes in response to branch mispredictions, traps, and the like. In the case of a pipeline flush, the resources committed to the flushed instructions are released as in retirement, but any speculative results or state changes caused by the flushed instructions are not committed to architectural registers. A pipeline flush affects only instructions in a single thread or a single virtual processor, leaving other active virtual processors unaffected.

Figure 9:
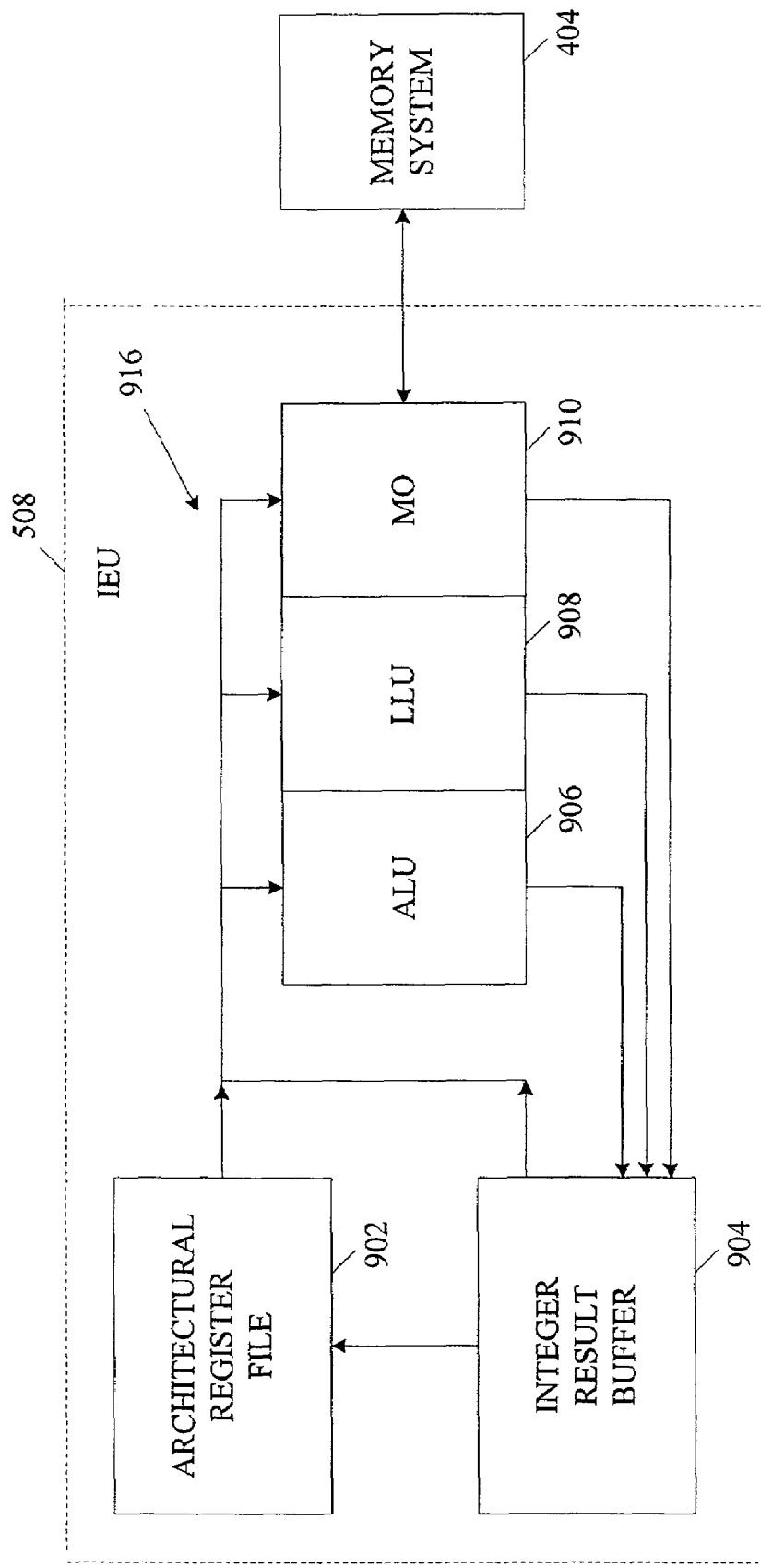
FIG. 9 is a schematic block diagram illustrating an integer execution unit of the out-of-order processor depicted in FIG. 5.

Referring to FIG. 9, instruction rename unit 504 comprises one or more pipeline stages that perform instruction renaming and dependency checking functions. Instruction renaming functionality maps register specifiers in the instructions to physical register locations and renames registers to prevent dependencies. Instruction rename unit 504 further performs dependency checking functions that analyze the instructions to determine whether operands identified by the instructions' register specifiers cannot be determined until another "live instruction" completes. The term "live instruction" herein refers to any instruction that has been fetched from the instruction cache but has not yet completed or been retired. Instruction rename unit 504 supplies renamed instructions to instruction scheduling unit (ISU) 506.

Program code may contain complex instructions called "macroinstructions" from the running object code. Complex macroinstructions may be arranged into a plurality of simple instructions or "microinstructions" to simplify and expedite execution. In a specific implementation, the execution units can be optimized to precisely handle instructions with a limited number of dependencies using a limited number of resources, for example registers. Complex instructions are those that execute using more than a predetermined limited number of resources or involve more than the limited number of dependencies. Instruction rename unit 504 includes functionality to translate or explode complex instructions into a plurality of microinstructions. The microinstructions are executed more efficiently in the execution units including floating point and graphics execution unit (FGU) 510 and integer execution unit (IEU) 514 or 508 than could the macroinstructions.

Integer execution unit 508 has one or more pipelines, each pipeline comprising one or more stages that implement integer instructions. Integer execution unit 508 also holds the results and state of speculatively executed integer instructions. Integer execution unit 508 performs final decoding of integer instructions before execution on the execution units and determines operand bypassing among instructions. Operand bypassing, also called "forwarding", is a technique for supplying operands from results of previous "live" instructions that are "in flight", rather than from a register file.

Integer execution unit 508 performs all aspect of integer instruction execution including determining correct virtual addresses for load/store instructions. Integer execution unit 508 also maintains the correct architectural register state for a plurality of integer registers in processor 402. Integer execution unit 508 may support functionality to access single and/or double precision architectural registers as well as single and/or double precision rename registers.

Floating point and graphics unit 510 includes one or more pipelines, each comprising one or more stages that implement floating point instructions. Floating point and graphics unit 510 also supports functionality for holding the results and state of speculatively executed floating point and graphic instructions. Floating point and graphics unit 510 performs final decoding of floating point instructions before execution of the instructions on the execution units and determines operand bypassing among instructions. In the specific example, floating point and graphics unit 510 includes one or more pipelines dedicated to implement special purpose multimedia and graphic instructions that are extensions to standard architectural instructions for a processor. In other embodiments, a floating point unit (FPU) may replace the floating point and graphics unit 510 in designs that do not use special purpose graphic and multimedia instructions. Floating point and graphics unit 510 supports functionality for accessing single and/or double precision architectural registers as well as single and/or double precision rename registers.

A data cache memory unit (DCU) 512, including cache memory 405 shown in FIG. 4, functions to cache memory reads from off-chip memory through external interface unit (EIU) 514. Optionally, data cache memory unit 512 also caches memory write transactions. Data cache memory unit 512 comprises one or more hierarchical levels of cache memory and associated logic to control the cache memory. One or more of the cache levels within data cache memory unit 512 may be read-only memory to eliminate the logic associated with cache writes.

Precise architectural update functionality is implemented primarily in the execution units such as integer execution unit 508 and floating point and graphics unit 510. Referring to FIG. 9, integer execution unit 508 includes an architectural register file 902 having a plurality of individual registers for exclusive use of integer execution unit 508. In the specific illustrative example, integer architectural register file 902 contains 160 registers and may have additional scratch registers. In a particular implementation the 160 registers are organized in four sets of global registers and eight sets of windowed registers. In for example a SPARC-V9 architecture specification, 32 registers are available at any time. The 32 register window is moved to 16 registers down the stack during a function call so that the upper and lower eight registers are shared between functions to pass and return values, and eight registers are local to a particular function call. The window is moved up on return so registers are loaded or saved at the top or the bottom of the register stack, allowing functions to be called in as little as one cycle. The register stack making up architectural register file 902 can be expanded, for example up to 512 registers or 32 windows to reduce loads and saves between functions. Similarly, architectural register file 902 can be scaled down to reduce time for saving the entire register set on the occurrence of an interrupt or context switching. Function calls are typically much more frequent than interrupts so that a large register set is usually beneficial. However, compilers exist that can produce code which uses a fixed register set as efficiently as a windowed register set across function calls.

Integer execution unit 508 comprises one or more pipelines 916 each supplying specific functionality and capable of handling specific types of instructions. In the illustrative system, functional units of integer execution unit 504 include an arithmetic logic unit (ALU) 906, a long latency unit (LLU) 908, and a memory unit 910. Arithmetic logic unit 906 may comprise multiple arithmetic logic pipelines or execution units. Long latency unit 908 is specifically adapted for handling instructions that require long latency or multiple cycles to complete. In contrast, arithmetic logic unit 906 is adapted to instructions that can be executed in a single cycle.

Memory unit 910 may be a separate subsystem or functional unit in many processor architectures and interfaces with memory system 404 to perform load and store operations. Memory unit 910 may be implemented in combination with integer execution unit 508 because the addresses used in load/store operations are typically defined to use an integer calculation by arithmetic logic unit 906 to generate memory addresses for memory unit 910. Execution pipelines 916 receive instructions and operands from architecture register file 902 and an integer result buffer 904, depending on the unit containing the most recent data, and supply results to integer result buffer 904. Execution pipelines 916 operate in parallel and produce results including integer calculation results, data from memory accesses, and condition codes.

In one implementation, integer execution unit 508 includes a second bank of execution units 916 to increase the processor's rate of instructions per cycle (IPC). In the illustrative implementation, memory system 404 maintains two mirrored copies of the L1 data cache so that a second bank can access memory simultaneously with execution units in a first bank. Similar modifications are primarily matters of device scaling and do not substantially affect the operation of integer result buffer 904.

Pipelines 916 produce a plurality of results including computational results in the form of coded integer values, condition codes, and data from memory accesses. From an architectural standpoint, results are intended to be stored in an instruction-specified register in architectural register file 902. Each instruction executed in execution pipelines 916 includes a destination register (RD) specifier encoded with the instruction. Destination register (RD) identifies a particular architectural register or registers in architectural register file 902 that is scheduled to receive a result. In an out-of-order processor, the results including condition codes and memory accesses generated by execution pipelines 916 are speculative until all predicate branch conditions are resolved. When a branch is predicted correctly, speculative results can then be stored or committed to the specified architectural register file. During the time between execution and commitment, integer results buffer 904 stores speculative results.

Integer results buffer 904 is functionally similar to a register rename buffer used in conventional devices. Unlike a conventional register rename buffer, integer result buffer 904 includes an entry or "slot" for each "live instruction" in processor 402. The slots in integer result buffer 904 include a first field for storing a speculative integer computation result and a second field for storing speculative condition codes. Integer result buffer 904 may be physically implemented as two separate registers to speed access time. In an illustrative embodiment, the condition code portion of the integer result buffer 904 has a one-to-one correspondence with the integer computation result portion of the integer result buffer 904.

In a particular implementation, processor 402 can support up to 128 live instructions at any time, although the number may be selected otherwise to meet the needs of a particular application. Integer result buffer 904 includes 128 slots with each slot having a field for holding integer computation results and condition codes. The implementation allows all 128 live instructions to be integer instructions that produce both results and condition codes. Integer result buffer 904 is thus much larger than necessary because a typical program code would rarely or never simultaneously execute 100% integer instructions each of which generates both results and conditions. However, the illustrative sizing ensures that integer result buffer 904 can always handle a capacity load.

A one-to-one correspondence between condition code fields and computation result fields greatly simplifies bookkeeping logic and access to integer results buffer 904. Immediately upon determination by retirement logic and instruction scheduling unit 506 that an instruction is to be retired or flushed, integer result buffer 904 can access the slot corresponding to the retiring instruction and transfer the accessed data to architectural register file 902. Similarly, condition codes for each retiring slot can be transferred from integer result buffer 904 to an architectural condition code file. Unlike conventional rename register implementations that require mapping renamed registers to architectural registers, no complex mapping is unnecessary. In one example, of the 128 live instructions in the specific example, instruction 35 may be identified for retirement, for example when all predicted branch instructions are resolved. Slot 35 in integer result buffer 904 is accessed to transfer to appropriate architectural register file registers in architectural register file 902.

Figure 10:
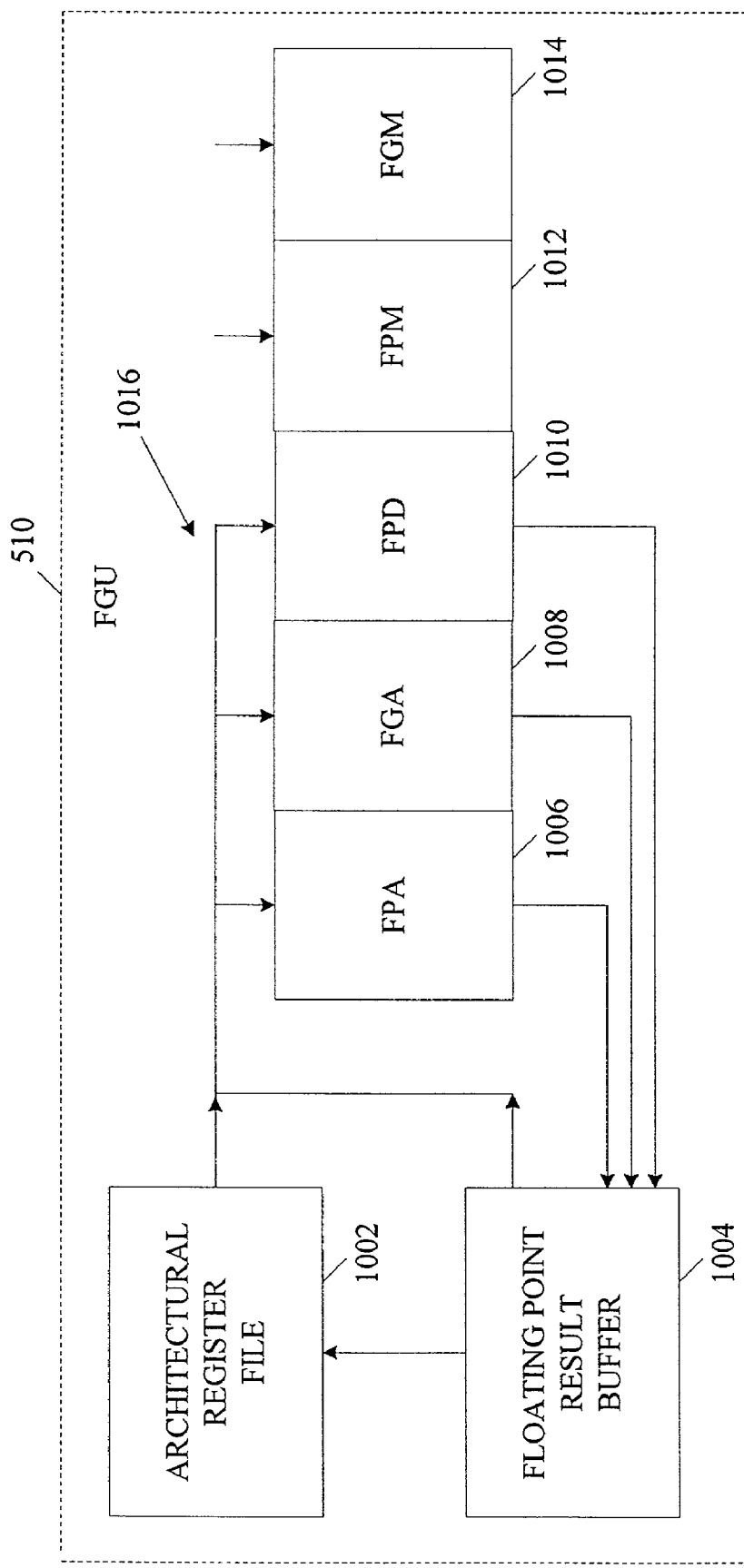
FIG. 10 is a schematic block diagram illustrating a floating point/graphics execution unit of the out-of-order processor depicted in FIG. 5.

FIG. 10 illustrates an example of a floating point and graphics unit 510 that is suitable for usage in the system. Floating point and graphics unit 510 comprises a plurality of pipelined execution units 1016. In general the execution units in pipelines 1016 are specifically adapted to process floating point and graphic instructions and share common register resources in architectural register file 1002. In one example, execution units include a floating point adder 1006, floating point graphics adder 1008, a floating point divider 1010, a floating point multiplier 1012, and a floating point graphics multiplier 1014. Selection of pipeline circuitry and the number of execution units within each pipeline is a matter of design choice, based on the type of instructions executed on processor 510.

Execution pipelines 1016 obtain operands from architectural register file 1002 or floating point result buffer 1004 depending on the unit having correct data. Execution pipelines 1016 generate floating point results, some of which are speculatively generated from unresolved conditional branch instructions.

In one implementation, floating point result buffer 1004 includes a plurality of register slots with one slot associated with each live instruction in processor 402. Floating point result buffer 1004 also stores speculative condition codes generated by floating point execution units 1016. Each live instruction is assigned one slot in floating points buffer 1004 with the slot holding both results of the floating point calculation and a condition code, if any.

When a live instruction is scheduled for retirement, the corresponding slot in floating point results buffer 1004 is accessed and the contents transferred to the instruction-specified results register and the instruction-specified condition code register in architectural register file 1002. On retirement, both floating point results buffer 1004 and integer result buffer 904 are optionally simultaneously accessed to simplify bookkeeping and control circuitry. For an integer instruction, the assigned slot and floating point result buffer 1004 is empty and does not alter the architectural state of processor 402. Conversely, for a floating point instruction, the assigned slot in integer result buffer 904 is empty and retirement does not alter the architectural state of processor 402.

One benefit of the described system is realized during branch recovery. When a branch is mispredicted, instructions scheduling unit 506 is operative to restore the architectural state to that which existed before the mispredicted branch was taken. The circuitry responsible for this is typically called branch recovery unit and may be located within instruction scheduling unit 506, or be provided as a separate functional unit in processor 402. The described system eases operation of the branch recovery process by simplifying the process of locating rename registers and clearing the results. In accordance with the described system, all of the live instructions generated by following a mispredicted branch tree have assigned slots in both floating point result buffer 1004 and integer result buffer 303. The branch recovery circuitry simply accesses and clears the contents of each of these assigned slots thereby preventing any of the speculative results or speculative condition codes from altering the architectural state by being transferred to the architectural register files 902 and 1002.

In a particular example, architectural register file 1002 comprises 64 slots for registers. The number of slots is determined by the instruction architecture for a particular processor. The 64 slots are partitioned into two 32-register partitions. In a particular example floating point register file 1002 includes 16 read ports and 6 write ports. All pipeline units 1016 can access the entire 64 entry architectural register file 1002. For a particular instruction, source registers and destination of registers specified in the instruction should be obtained from one 32-entry section or the other of architectural register file 1002 as specified by the SPARC V9 instruction architecture.

Floating point result buffer comprises 128 slots in the specific embodiment, corresponding to the 128 live instruction limit. The sizes of both integer result buffer 904 and floating point result buffer 1004 are based not on an estimate of the balance between floating point/integer operations, but rather upon the maximum number of live instructions in processor 402. Performance should not be substantially affected regardless of the mix of integer/floating point instructions in the program code.

More or fewer register slots may be provided in floating point and graphics unit 510, although typically one slot is assigned to each live instruction. The illustrative floating point result buffer 1004 is implemented with 22 read ports and 8 write ports. Data transfer between the first 32 register section and the second 32 register section can be accomplished via move instructions or through memory.

Although integer execution unit 508 can access memory through a first level (L1) data cache, the bandwidth for operands in floating point and graphics unit 510 may necessitate that operands be directly accessed from the second level (L2) cache using appropriate control circuitry. The illustrative system is applicable to a wide variety of architectures and memory design, some of which may require wider bandwidth access by the integer execution unit as opposed to the floating point execution unit. These and similar modifications are known to those having ordinary skill in the art.

Figure 11:
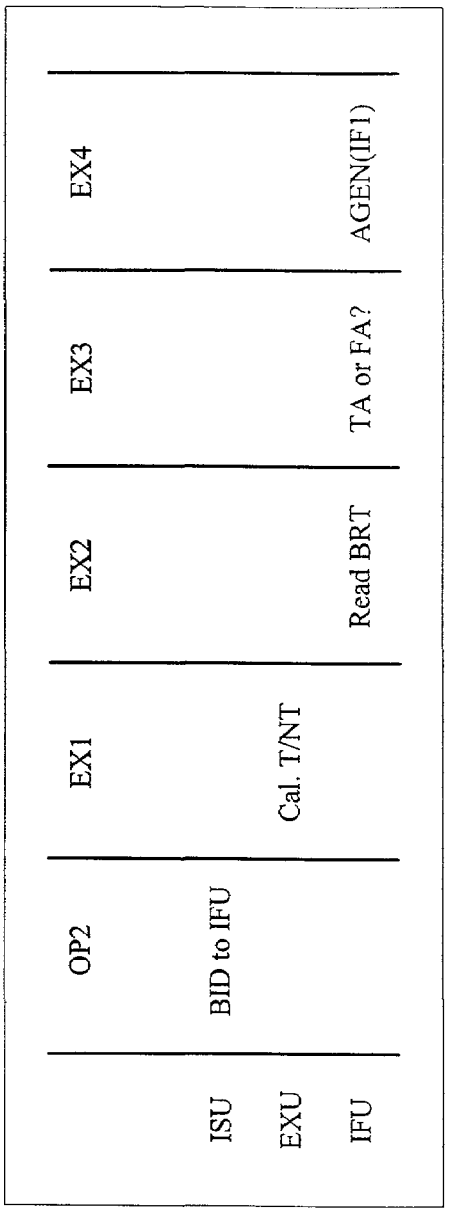
FIG. 11 is a timing diagram that illustrates cycle timing of a conditional branch resolution and resteering of instruction fetching.

Referring to FIG. 11, a timing diagram illustrates cycle timing of a conditional branch resolution and resteering of the instruction fetch unit 502 with respect to the execution stages of a conditional branch instruction. In an operand loading stage OP2 of the branch, the instruction scheduling unit 506 reads a branch identification BID out of the instruction wait buffer (IWB) 802. The BID is transmitted to the instruction fetch unit 502 to read the prediction from the branch repair table 615 in an execution stage EX1. The instruction fetch unit 502 compares the predicted direction to the actual direction in execution stage EX2. Results of the comparison feed address selected multiplexers to resteer the instruction fetch path in the instruction fetch unit 502 during the execution stage EX3.

Figure 12:
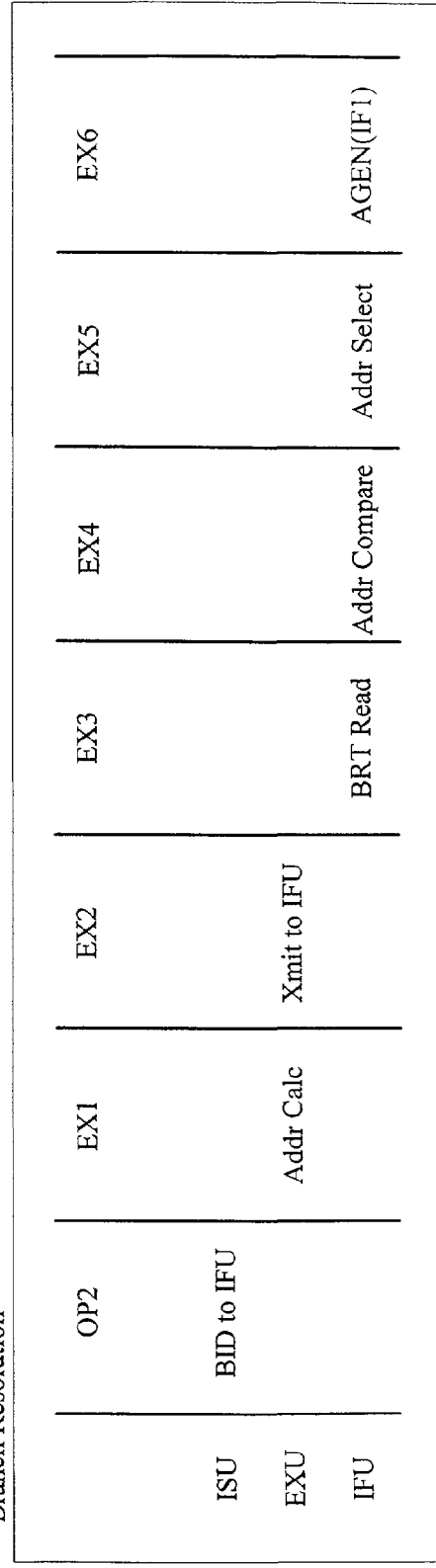
FIG. 12 is a timing diagram showing cycle timing of a register indirect branch resolution and resteering of instruction fetching.

Referring to FIG. 12, a timing diagram shows cycle timing of a register indirect branch resolution and resteering of the instruction fetch unit 502 with respect to execution stages of a register indirect branch instruction. In the operand loading stage OP2 of the branch, the instruction scheduling unit 506 reads a branch identification BID out of the instruction wait buffer (IWB) 802. A branch target address is determined during the execution stage EX1 of the branch instruction. The target address determination, typically a calculation operation, takes an entire cycle in comparison to the duration of a single cycle phase for branch direction determination. The BID is transmitted to the instruction fetch unit 502 to read the prediction from the branch repair table 615 in an execution stage EX2. In execution stage EX3, the instruction fetch unit 502 compares the predicted direction to the actual direction. Results of the comparison feed address selected multiplexers to resteer the instruction fetch path in the instruction fetch unit 502 during the execution stage EX5. Comparing the timing cycles for execution of the conditional branch and the register indirect branch instructions indicates that resteering of register indirect branches uses two more cycles than conditional branches.

Referring to FIG. 13, a timing diagram depicts cycle timing of a load dependent speculation and instruction replay following a data cache miss. In the illustrative example, the number of cycles from issue to data cache hit/miss for load instructions is seven cycles. Data from the data cache is available six cycles after load instruction issue. A typical executable program includes approximately one load instruction for three total instructions. To attain a suitable performance, the load instructions are issued speculatively in the exemplified by the cycle timing diagram shown in FIG. 13. Dependent instructions having operands that depend from load instructions are issued four cycles ahead of an actual cache hit/miss. In case the load misses in the data cache, the dependent instructions are bypassed operand values set to zero. When the actual hit/miss for the load access is known, the load instruction is marked for replay. When the load instruction is marked for replay, all dependent instructions are also marked for replay. The propagation delay for propagating the replay from one level of dependent instructions to a next level of dependents is one cycle as shown in FIG. 11.

When the data cache is filled, the load instruction is again picked for issue in an operation called a virtual pick. The virtual pick of the load instruction triggers picking of instructions that depend from the load instruction for operand and bypassing in the manner shown in FIG. 11.

Loads can be replayed in several circumstances and conditions including the data cache miss described hereinbefore. Loads are replayed in response to a translation lookaside buffer (not shown) miss in execution stage EX5. Loads are also replayed for read-after-write (RAW) instructions in a memory disambiguation buffer (MDB, not shown) in execution stage EX6. Another example of a replayed load occurs for a load miss buffer (LMB) full condition. An additional example of a replayed load occurs for an overeager issue condition. Overeager issue occurs when a load is issued prior to an older store with the same address as the older store. An overeager load condition occurs because loads are never dependent on stores for operands, and address disambiguation before instruction issue is not possible. Overeager issue is another complexity arising from out-of-order processing.

Dependent instructions that depend from load instructions may enter a repetitive replay condition until the load instruction bypasses the correct data, resulting in an error condition. The replay conditions of data cache miss, LMB full, data cache bank conflict, and TLB busy occur during the execution stage EX4. Pipeline timing for replay bit setting on the dependent instructions is indicated by the designation "XXX" in FIG. 14.

Translation lookaside buffer (TLB) miss replays occur during execution stage EX5. Pipeline timing for replay bit setting for a TLB miss on load dependent instructions is shown by the designation "YYY" in FIG. 14.

Memory disambiguation buffer (MDB) read-after-write (RAW) mispredict and MDB full replays occur in execution stage EX6. Pipeline timing for replay bit setting on load dependents of RAW mispredict and MDB full replays is indicated by the designation "ZZZ" in FIG. 14.

One operating technique is to initiate resteering the instruction fetch unit 502 immediately following branch resolution, but may result in frequent resteering and the repetitive replay condition causing a load instruction to bypass the correct data. Several solutions avoid frequent resteering. In a first example, resteering the instruction fetch unit 502 is delayed until after the branch retires. In a second example, branch resolution is delayed a predetermined time or number of cycles.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

The descriptions contained herein relate to many aspects of processor structure and operating techniques, including structural and functional aspects of various processor components. The structures and techniques are described that are highly useful in combination. However, various structures and techniques are also innovative and highly advantageous when employed alone or in multiple various subcombinations. The invention is to be limited by the claims alone and various limitations that are described in the specification but not included in a particular Claim re not to be considered inherent to the claim merely by inclusion in the specification.

In the claims, unless otherwise indicated the article "a" is to refer to "one or more than one".

What is claimed is:

1. A pipelined processor comprising:
   an instruction fetcher capable of fetching instructions from an instruction source;
   a branch resolver coupled to the instruction fetcher and capable of resolving a branch instruction;
   a delay element coupled between the branch resolver and the instruction fetcher, the delay element to allow for determination of whether the branch instruction has been resolved correctly;
   replay logic coupled to the instruction fetcher and capable of determining a replay condition; and
   logic coupled to receive input from the replay logic and input from the branch resolver, and the logic coupled to supply output to the instruction fetcher for determining a fetch operation of the instruction fetcher, wherein the logic selects either input from the branch resolver or input from the replay logic, wherein the output supplied to the instruction fetcher is the input selected by the logic, and wherein the input from the branch resolver is delayed by the delay element.

2. A pipelined processor according to claim 1 wherein the replay condition includes a data cache hit/miss, a translation lookaside buffer miss, read-after-write (RAW) hazard, a load miss buffer (LMB) full condition, or an overeager issue condition.

3. A pipelined processor according to claim 1 wherein the instruction fetcher resteers an instruction fetch based on resolution of a branch instruction after the branch instruction retires.

4. A pipelined processor according to claim 1 wherein the instruction fetcher resteers an instruction fetch based on a delayed branch instruction resolution.

5. A pipelined processor according to claim 1 further comprising:
   an instruction pipeline with the delay element inserted in branch condition and replay control pathways.

6. A pipelined processor according to claim 1 wherein:
   the processor is a deeply pipelined processor, microprocessor, CPU, digital signal processor, sequencer, or computational logic.

7. The pipelined processor of claim 1 wherein the determination of whether the branch instruction resolves correctly is based, at least in part, on the replay logic determining a replay condition.

8. The pipelined processor of claim 1,
   wherein the logic combines input from the replay logic with input from the branch resolver that has been delayed by the delay element, and
   wherein output supplied from the logic to the instruction fetcher is the combined inputs.

9. The pipelined processor of claim 1 wherein the branch instruction includes a conditional branch instruction or an unconditional branch instruction.

10. A pipelined processor comprising:
    an instruction fetcher capable of fetching instructions from an instruction source;
    a branch resolver coupled to the instruction fetcher and capable of resolving a branch instruction;
    a delay element coupled between the branch resolver and the instruction fetcher, the delay element to allow for determination of whether the branch instruction has been resolved correctly;
    a load miss buffer operable to indicate detection of a replay condition for load instructions; and
    the instruction fetcher coupled with the load miss buffer, the instruction fetcher operable to fetch instructions based at least in part on both replay condition indications from the load miss buffer and branch instruction resolution indications from the branch resolver.

11. The pipelined processor of claim 10 further comprising a logic gate coupled with the instruction fetcher, the load miss buffer, and the branch resolver, the logic gate coupled to receive as inputs the branch instruction instance resolution indications and the replay condition indications, and operable to logically combine the indications and output the logically combined indications.

12. The pipelined processor of claim 10 further comprising an instruction scheduling unit coupled with the fetch unit and the load miss buffer.

13. The pipelined processor of claim 10 further comprising a memory disambiguation buffer that includes the load miss buffer.

14. The pipelined processor of claim 10 further comprising an instruction execution unit that includes the branch resolver.

15. The pipelined processor of claim 10, wherein the replay condition includes one or more of a load miss buffer full condition, a load miss condition, a read-after-write data hazard condition, a translation lookaside buffer miss condition, and an overeager load condition.

* * * * *